(12) United States Patent
Lee et al.

(10) Patent No.: US 9,705,152 B2
(45) Date of Patent: Jul. 11, 2017

(54) POUCH CELL

(71) Applicant: HYUNDAI MOTOR COMPANY, Seoul (KR)

(72) Inventors: Sang Joon Lee, Anyang-si (KR); Woo Jin Shin, Seoul (KR); Jung Young Cho, Seoul (KR); Byung Jo Jeong, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 90 days.

(21) Appl. No.: 14/835,261

(22) Filed: Aug. 25, 2015

(65) Prior Publication Data

US 2016/0149257 A1    May 26, 2016

(30) Foreign Application Priority Data

Nov. 20, 2014    (KR) .......................... 10-2014-0162959

(51) Int. Cl.
*H01M 10/04*    (2006.01)
*H01M 10/0525*    (2010.01)
*H01M 10/0585*    (2010.01)

(52) U.S. Cl.
CPC ... *H01M 10/0481* (2013.01); *H01M 10/0525* (2013.01); *H01M 10/0585* (2013.01)

(58) Field of Classification Search
CPC ......... H01M 10/0481; H01M 10/0525; H01M 10/0585
See application file for complete search history.

(56) References Cited

U.S. PATENT DOCUMENTS

2006/0216591 A1*  9/2006  Lee ....................... H01M 2/021
                                                         429/175
2013/0202932 A1   8/2013  Song et al.
2014/0154554 A1   6/2014  Kim et al.

FOREIGN PATENT DOCUMENTS

| JP | 2009-181898 A | 8/2009 | |
|----|---|---|---|
| JP | 2009-252397 A | 10/2009 | |
| KR | 10-2001-0005018 A | 1/2001 | |
| KR | 10-2007-0027351 A | 3/2007 | |
| KR | 10-2007-0109080 A | 11/2007 | |
| KR | 10-2013-0021784 A | 3/2013 | |
| KR | WO 2013109098 A1 * | 7/2013 | ............ H01M 2/021 |
| KR | 10-2013-0090190 A | 8/2013 | |

* cited by examiner

*Primary Examiner* — Jane Rhee
(74) *Attorney, Agent, or Firm* — McDermott Will & Emery LLP

(57) ABSTRACT

A pouch cell includes a battery unit and a structure mounted on the battery unit. The structure is configured to limit an expansion of the battery unit and accommodate an electrolyte.

12 Claims, 10 Drawing Sheets

POUCH CELL

CROSS-REFERENCE TO RELATED APPLICATION

This application is based on and claims the benefit of priority to Korean Patent Application No. 10-2014-0162959, filed on Nov. 20, 2014 in the Korean Intellectual Property Office, the disclosure of which is incorporated herein in its entirety by reference.

TECHNICAL FIELD

The present disclosure relates to a pouch cell, and more particularly to a pouch cell in which a structure which restricts an expansion of a battery cell and accommodates an electrolyte is mounted in a pouch type lithium ion battery cell.

BACKGROUND

As illustrated in FIG. 1, the existing pouch type lithium ion battery cell has a structure in which a pouch 5 covers a battery unit 4 in which a cathode 1, an anode 2, a separation membrane 3 are sequentially stacked and an electrolyte injects and seals the pouch 5.

As the existing battery cell is repeatedly charged and discharged, the electrolyte included therein is depleted and a reactant 6 is accumulated from both ends 7 in a longitudinal direction of the anode 2. This causes a volume expansion of both ends 7 in a longitudinal direction of the battery unit 4. The volume expansion of the battery unit 4 increases a distance between the electrodes to increase an internal resistance and accelerate a deterioration to reduce use efficiency of a battery cell.

Meanwhile, an exterior material of a pouch is configured of a thin film having a thickness of 150 µm and therefore has no rigidity to suppress the volume expansion occurring inside the battery cell. Therefore, the pouch does not stop the volume expansion of the battery unit. Further, as described above, the expansion of the battery unit increases the internal resistance at the time of charging and discharging to reduce the use efficiency of the battery cell and reduce endurance reliability of the battery cell.

Further, the existing pouch type lithium ion battery cell has the battery unit positioned in the pouch and the electrolyte injected into the pouch and is then vacuum-packaged to completely remove air inside the pouch. In this case, the pouch does not have rigidity and therefore may not maintain a form and therefore the remaining space other than the portion in which the battery unit is positioned is compressed in a vacuum state and the electrolyte may not be present.

Therefore, the existing pouch type lithium ion battery cell does not have an additional space in which the electrolyte may be present, except for the battery unit. Due to the structural limitation, as the charging and discharging are repeated, the electrolyte is depleted, and as a result, the deterioration in the battery cell to reduce the use efficiency of the battery occurs.

RELATED ART DOCUMENT

Patent Document (Patent Document 1) Korean Patent Laid-Open Publication No. 10-2207-0027351 (Mar. 9, 2007)

SUMMARY

The present disclosure has been made to solve the above-mentioned problems occurring in the prior art while advantages achieved by the prior art are maintained intact.

An aspect of the present disclosure provides a pouch cell in which a structure is mounted inside a pouch type lithium ion battery cell to suppress a volume expansion of a battery unit and a space in which an electrolyte may be stored is additionally secured to improve service life of the battery cell.

According to an exemplary embodiment of the present inventive concept, a pouch cell includes a battery unit and a structure mounted on the battery unit. The structure is configured to limit an expansion of the battery unit and accommodate an electrolyte.

In certain embodiments, the battery unit may have two opposing ends in a longitudinal direction and the structure may include a space part, a mounting part, and a through hole. The space part may have a space formed therein. The mounting part may extend from the space part and receive one end of the battery unit therein. The through hole may be formed in the space part and may be configured to allow a lead wire to penetrate the through hole and extend from the battery unit to outside of the pouch cell.

In certain embodiments, the mounting part may have an inner width substantially equal to a width of a cross section of the battery unit taken in a width direction, the width direction substantially perpendicular to the longitudinal direction.

In certain embodiments, the mounting part may extend toward the battery unit from a perimeter of the space part. The mounting part may have two opposing first sides and two opposing second sides, wherein the first sides are substantially parallel to the second sides, and wherein the first sides extend farther along the battery unit than the second sides.

In certain embodiments, the space part may have opposing upper and lower surfaces. The lower surface of the space part may be adjacent the mounting part and may have a width substantially equal to a width of a cross section of the battery unit taken in a width direction. The upper surface may be substantially parallel to the lower surface. The space may be formed between the upper and lower surfaces.

In certain embodiments, the through hole may penetrate the upper and lower surfaces and have upper and lower opposing sides. The upper side of the through hole may penetrate the upper surface of the space part and the lower side of the through hole may penetrate the lower surface of the space part. A width of the lower side of the through hole may be substantially equal to a width of the upper side of the through hole.

In certain embodiments, the pouch cell further includes a pouch enclosing the battery unit and the structure.

In certain embodiments, the battery unit is with a cathode, a separation membrane, and an anode sequentially stacked so that the separation membrane is positioned between the cathode and the anode.

In certain embodiments, the stacked cathode, separation membrane, and anode are wound in a jelly roll shape.

According to an exemplary embodiment of the present inventive concept, a pouch cell includes: a battery unit including a cathode, a separation membrane, and an anode. The battery unit has two opposing ends in a longitudinal direction. A structure is mounted at each end of the battery unit and is configured to limit an expansion of the battery unit due to a reactant generated inside the battery unit as charging and discharging are repeated.

In certain embodiments, the pouch cell may further include a pouch configured to accommodate the battery unit and the structure, wherein the pouch vacuum-packages the battery unit and the structure. In certain embodiments, the pouch may contain an electrolyte, and the structure may include a space part in which configured to accommodate the electrolyte.

BRIEF DESCRIPTION OF THE DRAWINGS

The above and other objects, features and advantages of the present inventive concept will be more apparent from the following detailed description taken in conjunction with the accompanying drawings.

DETAILED DESCRIPTION

Figure 1:
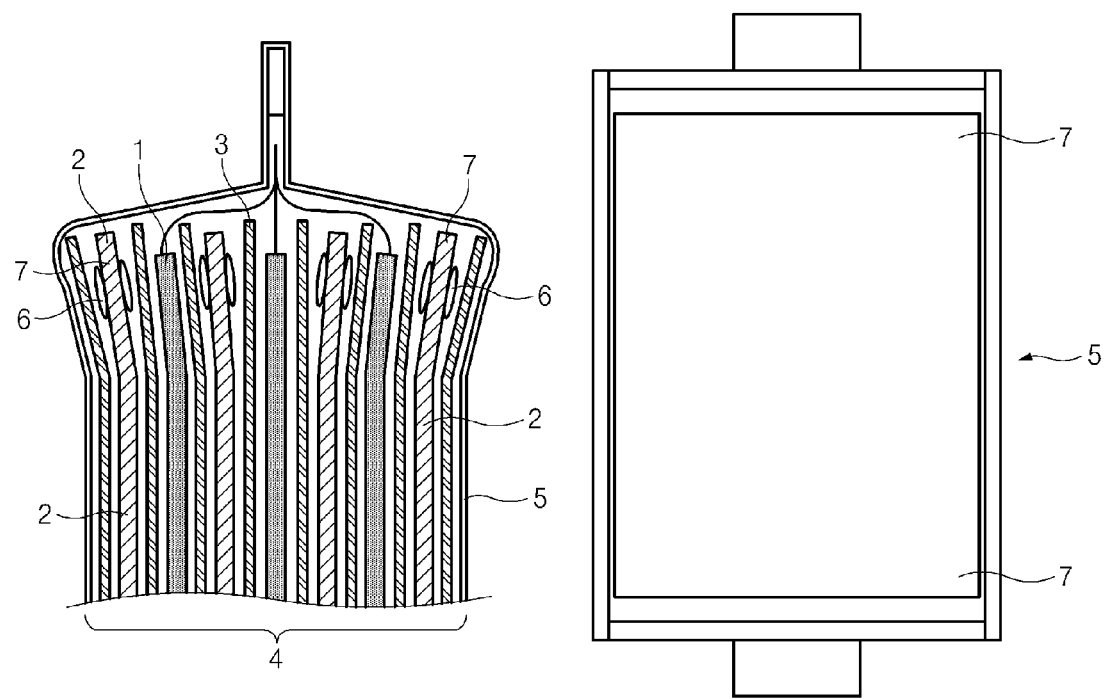
FIG. 1 is a cross-sectional view and a plan view of main parts of the existing pouch type battery cell.
Figure 2:
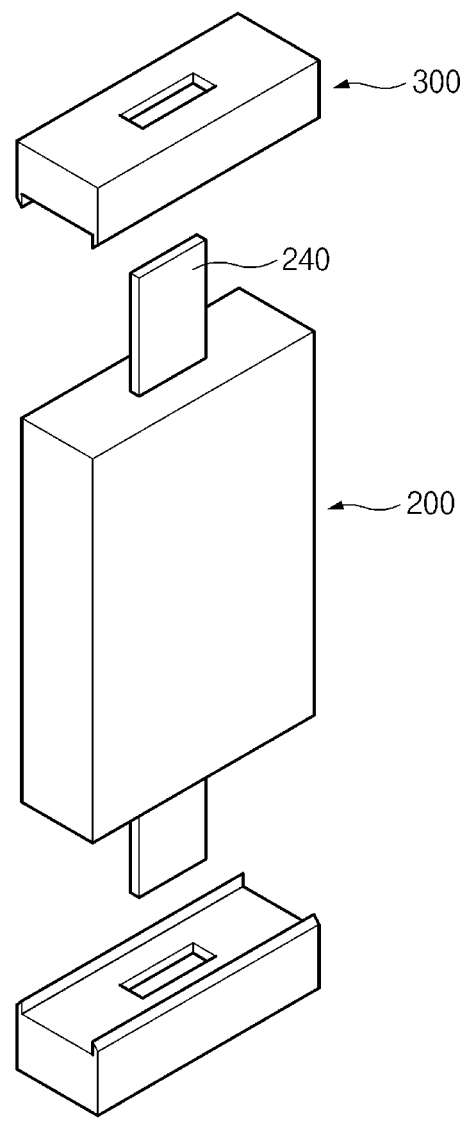
FIG. 2 is an exploded perspective view of a pouch cell according to an exemplary embodiment of the present inventive concept.
Figure 3:
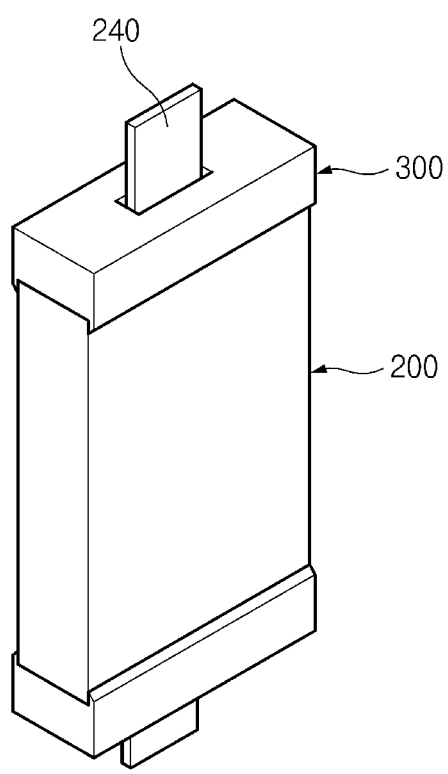
FIG. 3 is a perspective view of the pouch cell of FIG. 2.
Figure 4:
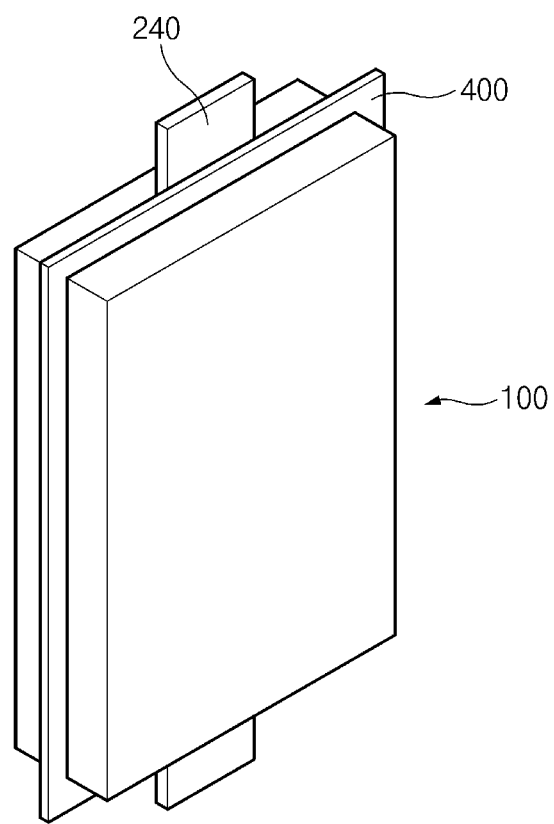
FIG. 4 is another perspective view of the pouch cell of FIG. 2.
Figure 5:
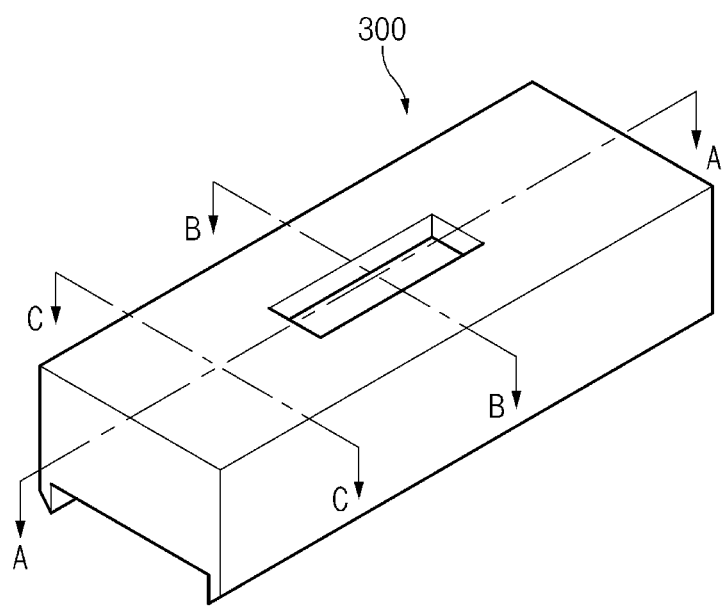
FIG. 5 is a perspective view of a structure mounted in the pouch cell of FIG. 2.
Figure 6:
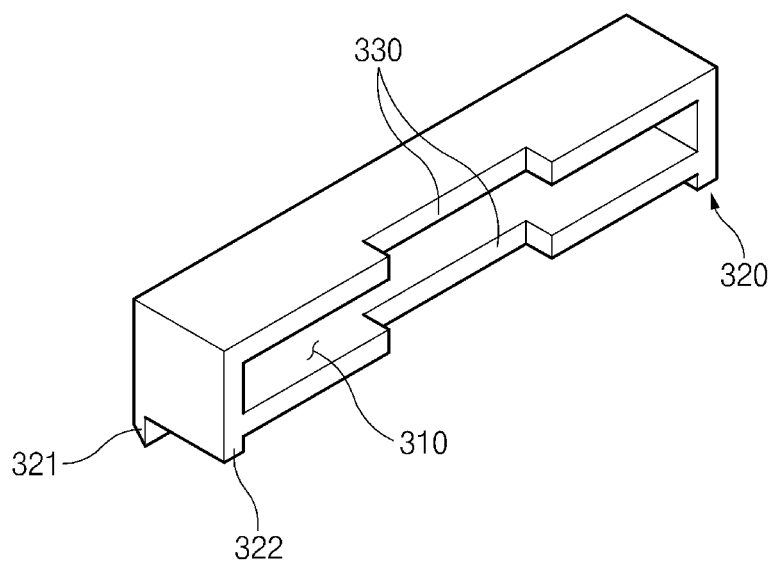
FIG. 6 is a perspective cross-sectional view taken along the line A-A' of FIG. 5.
Figure 7:
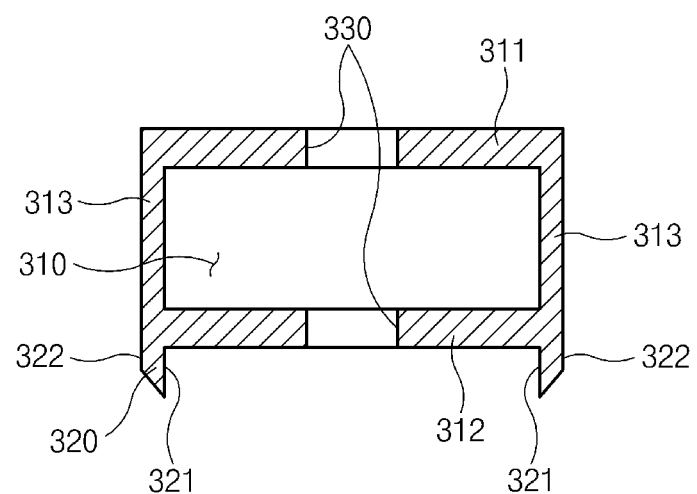
FIG. 7 is a cross-sectional view taken along the line B-B' of FIG. 5.
Figure 8:
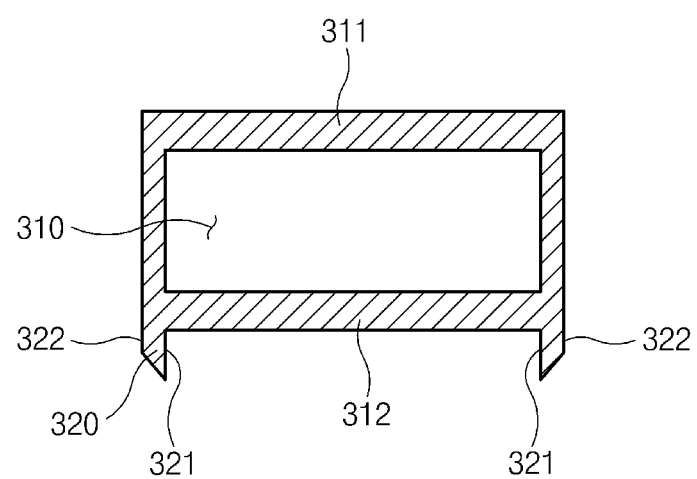
FIG. 8 is a cross-sectional view taken along the line C-C of FIG. 5.

Exemplary embodiments of the present inventive concept will be described in detail with reference to the accompanying drawings.

As illustrated in FIGS. 2 to 10, a pouch cell 100 according to an exemplary embodiment of the present inventive concept includes a battery unit 200 in which a cathode 220, a separation membrane 230, and an anode 210 are stacked, and structures 300 which, in certain embodiments, are each mounted at both ends in a longitudinal direction of the battery unit 200 and limit an expansion of the battery unit 200 caused by a reactant 250 occurring inside the battery unit 200 as the charging and discharging are repeated. Further, in certain embodiments, an electrolyte 410 is additionally accommodated in the structure 300.

As illustrated in FIGS. 5 to 8, in certain embodiments, the structure 300 includes a space part 310 in which a space is formed, a mounting part 320 protruding from the space part 310 to have one end of the battery unit 200 fitted therein, and a through hole 330 formed in the space part 310 to have a lead wire 240, which extends from the battery unit 200 to the outside, mounted therein. In certain embodiments, the structure 300 may be made of polymer materials such as polypropylene and polyethylene terephthalate having excellent chemical resistance against the electrolyte 410.

In certain embodiments, the mounting part 320 protrudes from the space part 310 and an inner width thereof is formed to be substantially equal to a cross section width in a width direction of the battery unit 200. According to an exemplary embodiment of the present inventive concept, the mounting part 320 protrudes from a perimeter of the space part 310 and has two opposing first sides 321 and two opposing second sides 322 substantially parallel to the first sides 321. The first sides 321 extend farther toward the battery unit 200 than the second sides 322.

In certain embodiments, the space part 310 has the same width as the cross section width in the width direction of the battery unit 200 and includes a lower surface 312 formed adjacent the mounting part 320 and an upper surface 311 which is substantially parallel to the lower surface 312 and forms a space together with the lower surface 312. In certain embodiments, the upper surface 311 and the lower surface 312 form a sealed structure by side walls 313 formed at edges of the upper surface 311 and the lower surface 312.

In certain embodiments, the through hole 330 penetrates the upper 311 and the lower surface 312. The through hole 330 has upper and lower opposing sides, the upper side of the through hole penetrating the upper surface 311 of the space part and the lower side of the through hole penetrating the lower surface 312 of the space part. According to an exemplary embodiment of the present inventive concept, a width of the lower side of through hole 330 formed on the lower surface 310 is substantially equal to that of the upper side through hole 330 formed on the upper surface 311.

In certain embodiments, the pouch cell 100 according to the exemplary embodiment of the present inventive concept includes a pouch 400 in which the battery unit 200 is embedded and the structure 300 is embedded, together with the battery unit 200. In certain embodiments, the battery unit 200 is sequentially stacked with a cathode 220, an anode 210, and a separation membrane 230 so that the separation membrane 230 is positioned between the cathode 220 and the anode 210. In certain embodiments, the sequentially stacked cathode 220, separation membrane 230, and anode 210 are wound in a jelly roll shape such that the battery unit 200 is manufactured in a jelly roll form which is a known art term. In certain embodiments, the pouch 400 vacuum-packages the battery unit 200 and the structure 300 and thus the battery unit 200 and the structure 300 adhere to the pouch 400. The pouch 400 accommodates the electrolyte 410. In certain embodiments, the electrolyte 410 is accommodated in the space part 310 which is formed in the battery unit 200 and the structure 300.

Figure 9:
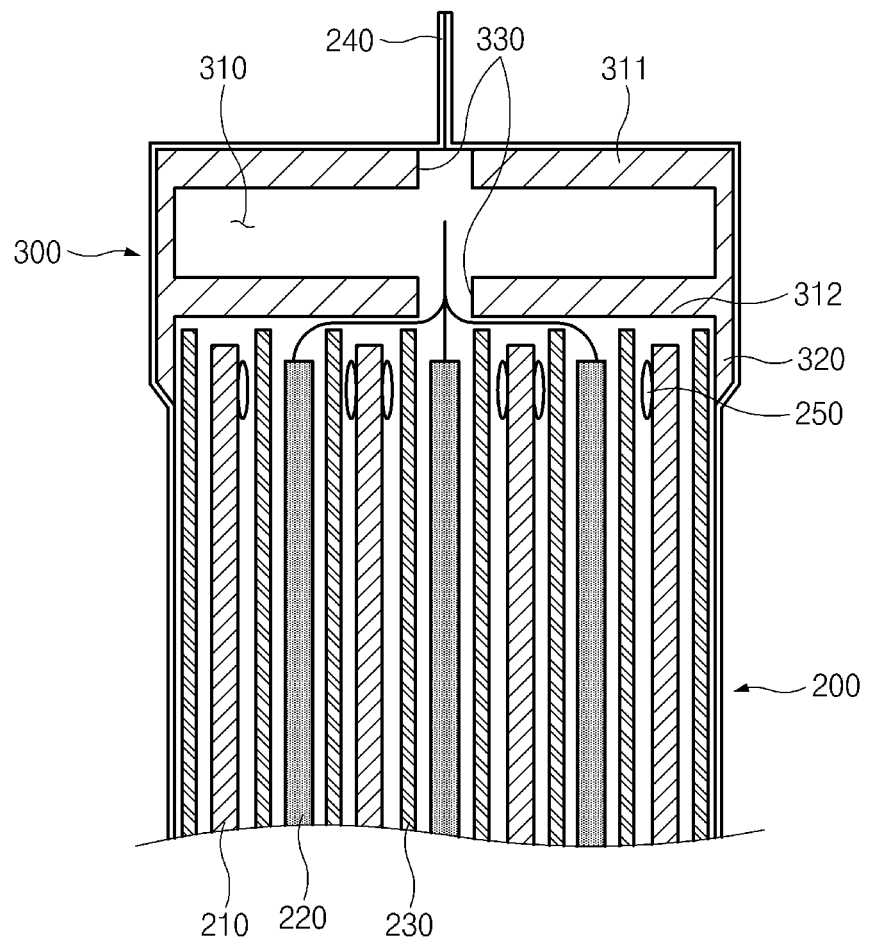
FIG. 9 is a cross-sectional view of main parts of the pouch cell of FIG. 2.

In the pouch cell 100 according to an certain embodiments of the present inventive concept have the structures 300 press both ends in the longitudinal direction of the battery unit 200 by mounting the structures 300 at both ends in the longitudinal direction of the battery unit 200. As a result, as illustrated in FIG. 9, when the electrolyte 410 is depleted, the expansion of the battery unit 200 due to the reactant 250 precipitated at both ends in the longitudinal direction of the battery unit 200 is suppressed. Since the expansion of the battery unit 200 is suppressed, the increase in internal resistance and the deterioration in the battery cell due to the volume expansion of the battery unit 200 are suppressed.

Figure 10:
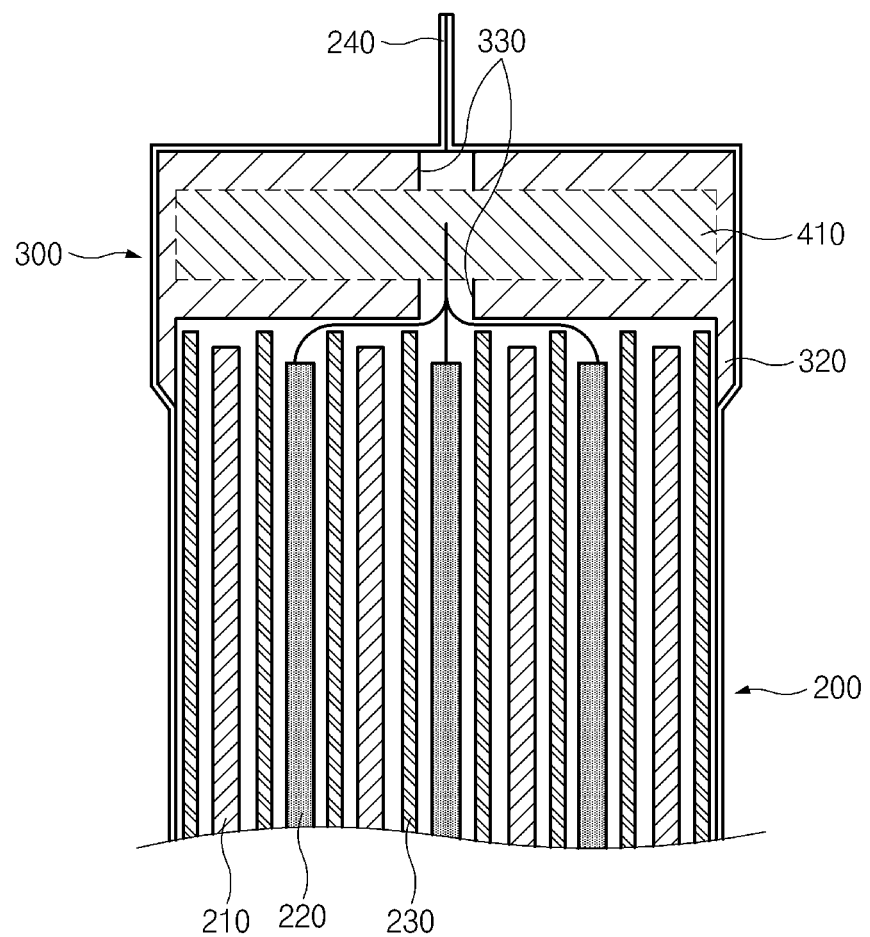
FIG. 10 is a cross-sectional view of the main parts of the pouch cell shown in FIG. 9 with the addition of an electrolyte.

Further, as illustrated in FIG. 10, in certain embodiments, it is possible to secure a space, which may additionally store the electrolyte 410, inside the vacuum-sealed pouch due to the structure 300. As a result, the electrolyte 410 may be additionally injected. Compared with the related art, a large amount of electrolyte 410 is present inside the battery cell and therefore a use period of the battery cell is increased. Further, the deterioration of the battery cell due to the depletion of the electrolyte 410 is suppressed.

As described above, according to the exemplary embodiment of the present inventive concept, it is possible to suppress the volume of the battery unit of the pouch type lithium ion battery cell from being expanded.

Further, it is possible to slow down the depletion of the electrolyte of the pouch type lithium ion battery cell and reduce the use efficiency of the battery cell, that is, the deterioration in the battery cell due to the depletion of the electrolyte.

Hereinabove, although the present inventive concept has been described with reference to exemplary embodiments and the accompanying drawings, the present inventive concept is not limited thereto, but may be variously modified and altered by those skilled in the art to which the present inventive concept pertains without departing from the spirit and scope of the present inventive concept claimed in the following claims.

What is claimed is:

1. A pouch cell, comprising:
    a battery unit; and
    a structure mounted on the battery unit, the structure configured to limit an expansion of the battery unit and accommodate an electrolyte,
    wherein the structure includes: a space part having a space formed therein; and a through hole formed in the space part and configured to allow a lead wire to penetrate the through hole and extend from the battery unit to outside of the pouch cell,
    wherein the space part includes opposing lower and upper surfaces,
    wherein the through hole penetrates the upper and lower surfaces of the space part and has upper and lower opposing sides, the upper side of the through hole penetrating the upper surface of the space part and the lower side of the through hole penetrating the lower surface of the space part, and
    wherein a width of the lower side of the through hole is substantially equal to a width of the upper side of the through hole.

2. The pouch cell according to claim 1, wherein the battery unit has two opposing ends in a longitudinal direction and the structure includes:
    a mounting part extending from the space part and receiving one end of the battery unit therein.

3. The pouch cell according to claim 2, wherein the mounting part has an inner width substantially equal to a width of a cross section of the battery unit taken in a width direction, the width direction substantially perpendicular to the longitudinal direction.

4. The pouch cell according to claim 3, wherein the mounting part extends toward the battery unit from a perimeter of the space part, the mounting part having two opposing first sides and two opposing second sides, wherein the first sides are substantially parallel to the second sides, and wherein the first sides extend farther along the battery unit than the second sides.

5. The pouch cell according to claim 2, wherein
    the lower surface adjacent the mounting part and having a width substantially equal to a width of a cross section of the battery unit taken in a width direction, the width direction substantially perpendicular to the length direction, and the upper surface substantially parallel to the lower surface, wherein the space is formed between the upper and lower surfaces.

6. The pouch cell according to claim 1, further comprising a pouch enclosing the battery unit and the structure.

7. The pouch cell according to claim 1, wherein the battery unit is with a cathode, a separation membrane, and an anode sequentially stacked so that the separation membrane is positioned between the cathode and the anode.

8. The pouch cell according to claim 7, wherein the stacked cathode, separation membrane, and anode are wound in a jelly roll shape.

9. A pouch cell comprising:
    a battery unit comprising a cathode, a separation membrane, and an anode sequentially stacked, the battery unit having two opposing ends in a longitudinal direction; and
    a structure mounted at each end of the battery unit and configured to limit an expansion of the battery unit due to a reactant generated inside the battery unit as charging and discharging are repeated,
    wherein the structure includes: a space part having a space formed therein; and a through hole formed in the space part and configured to allow a lead wire to penetrate the through hole and extend from the battery unit to outside of the pouch cell,
    wherein the space part includes opposing lower and upper surfaces,
    wherein the through hole penetrates the upper and lower surfaces of the space part and has upper and lower opposing sides, the upper side of the through hole penetrating the upper surface of the space part and the lower side of the through hole penetrating the lower surface of the space part, and
    wherein a width of the lower side of the through hole is substantially equal to a width of the upper side of the through hole.

10. The pouch cell according to claim 9, further comprising:
    a pouch configured to accommodate the battery unit and the structure,
    wherein the pouch vacuum-packages the battery unit and the structure.

11. The pouch cell according to claim 10, wherein the pouch contains an electrolyte, and
    wherein the space part is configured to accommodate the electrolyte.

12. The pouch cell according to claim 9, wherein the structure is formed of a polymer material containing polypropylene or polyethylene terephthalate.

* * * * *